United States Patent
Liu

(10) Patent No.: US 9,620,958 B2
(45) Date of Patent: Apr. 11, 2017

(54) ELECTRONIC CIGARETTE BATTERY REVERSE CONNECTION PROTECTION DEVICE AND METHOD FOR USING THE SAME

(71) Applicant: Qiuming Liu, Shenzhen (CN)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 959 days.

(21) Appl. No.: 13/928,846

(22) Filed: Jun. 27, 2013

(65) Prior Publication Data

US 2014/0352705 A1 Dec. 4, 2014

(30) Foreign Application Priority Data

May 29, 2013 (CN) .......................... 2013 1 0207465

(51) Int. Cl.
*H02H 11/00* (2006.01)
(52) U.S. Cl.
CPC ................................. *H02H 11/003* (2013.01)
(58) Field of Classification Search
CPC ....... H02H 11/003; H02H 11/002; H02H 3/18

USPC ............................................. 361/84; 320/165
See application file for complete search history.

(56) References Cited

U.S. PATENT DOCUMENTS 9,300,129 B2 * 3/2016 Gofman .................... H02H 3/18

OTHER PUBLICATIONS

Zhong: Publication No. CN-201285583; Entire specification and Drawings.*

* cited by examiner

*Primary Examiner* — Dharti Patel
(74) *Attorney, Agent, or Firm* — Tim Tingkang Xia, Esq.; Locke Lord LLP

(57) ABSTRACT

An electronic cigarette battery reverse connection protection device and method for using the same, comprising: a battery, a switch circuit, an alarm circuit, a discharge control circuit and a load circuit. The battery is connected with the switch circuit, the switch circuit is connected with the discharge control circuit and the alarm circuit respectively, the discharge control circuit is connected with the load circuit. The switch circuit is configured to determine whether the battery is reversely connected according to a power signal provided by the battery; when the battery is reversely connected, the discharge control circuit is turned off, and the alarm circuit is turned on and generates an alarm signal; and when the battery is correctly connected, the discharge control circuit controls the load circuit working.

11 Claims, 6 Drawing Sheets

ELECTRONIC CIGARETTE BATTERY REVERSE CONNECTION PROTECTION DEVICE AND METHOD FOR USING THE SAME

CROSS-REFERENCE TO RELATED APPLICATIONS

This non-provisional application claims priorities under 35 U.S.C. §119(a) on Patent Application No. 201310207465.X filed in P.R. China on May 29, 2013, the entire contents of which are hereby incorporated by reference.

FIELD OF THE INVENTION

The present invention relates to the field of electrical cigarettes, and more particularly, relates to an electronic cigarette battery reverse connection protection device and a method for using the same.

BACKGROUND OF THE INVENTION

At present, most electronic cigarette products do not include battery anti-reverse circuit.

An electronic cigarette generally uses the connection circuit structure as shown in FIG. 1, and there is a certain risk in this circuit structure. When batteries of battery-replaceable electronic cigarette products and accessories are replaced, discharge control circuits may be damaged, electronic elements may be burned and generate short circuits, and the batteries may explode and even cause fire.

SUMMARY OF THE INVENTION

The objective of the present invention is to provide an electronic cigarette reverse connection protection device and a method for using the same, aiming at the above-mentioned drawbacks that the typical technology cannot achieve the battery anti-reverse circuit.

The technical solutions of the present invention for solving the technical problems are as follows: the present invention constructs a kind of electronic cigarette battery reverse connection protection device, comprising: a battery, a switch circuit, an alarm circuit, a discharge control circuit and a load circuit; the battery is connected with the switch circuit; the switch circuit is connected with the discharge control circuit and the alarm circuit respectively, and the discharge control circuit is connected with the load circuit; and the switch circuit is configured to determine whether the battery is reversely connected according to a power signal provided by the battery, when the battery is reversely connected, the discharge control circuit is turned off, and the alarm circuit is turned on and generates an alarm signal; and when the battery is correctly connected, the discharge control circuit controls the load circuit working.

In the present invention the electronic cigarette battery reverse connection protection device, the switch circuit includes a first switch circuit and a second switch circuit; the first switch circuit is connected with the discharge control circuit, the first switch circuit is used to turn the discharge control circuit off when the battery is determined as being reversely connected, and the second switch circuit is connected with the alarm circuit, and the second switch circuit is configured to turn the alarm circuit on when the battery is determined as being reversely connected, and thereby reminding that the battery is reversely connected.

Advantageously, the first switch circuit includes a first MOS transistor, the first MOS transistor is a P type MOS transistor, the gate of the first MOS transistor is connected with the cathode of the battery; the drain of the first MOS transistor is connected with the anode of the battery; and the source of the first MOS transistor is connected with the discharge control circuit.

Advantageously, the first switch circuit includes a first MOS transistor, the first MOS transistor is an N type MOS transistor, the gate of the first MOS transistor is connected with the anode of the battery; the drain of the first MOS transistor is connected with the cathode of the battery; and the source of the first MOS transistor is connected with the discharge control circuit.

Advantageously, the second switch circuit includes a second MOS transistor, the second MOS transistor is a P type MOS transistor, the gate of the second MOS transistor is connected with the anode of the battery; the drain of the second MOS transistor is connected with the cathode of the battery; and the source of the second MOS transistor is connected with the discharge control circuit.

Advantageously, the second switch circuit includes a second MOS transistor, the second MOS transistor is an N type MOS transistor, the gate of the second MOS transistor is connected with the cathode of the battery; the drain of the second MOS transistor is connected with the anode of the battery; and the source of the second MOS transistor is connected with the discharge control circuit.

Advantageously, the second switch circuit includes a diode, the cathode of the diode is connected with the anode of the battery; the anode of the diode is connected with the alarm circuit; and the diode is configured to control the alarm circuit to be turned on and off by unilateral conductivity thereof.

Advantageously, the alarm circuit includes a light-emitting diode and a current-limiting resistor, the cathode of the light-emitting diode is connected with the gate of the second MOS transistor; the anode of the light-emitting diode is connected with one end of the current-limiting resistor; and the other end of the current-limiting resistor is connected with the source of the second MOS transistor.

Advantageously, the alarm circuit includes a light-emitting diode and a current-limiting resistor, the cathode of the light-emitting diode is connected with the source of the second MOS transistor; the anode of the light-emitting diode is connected with one end of the current-limiting resistor; the other end of the current-limiting resistor is connected with the gate of the second MOS transistor.

Advantageously, the alarm circuit includes a light-emitting diode and a current-limiting resistor, the cathode of the light-emitting diode is connected with the anode of the diode; the anode of the light-emitting diode is connected with one end of the current-limiting resistor; the other end of the current-limiting resistor is connected with the cathode of the battery.

Advantageously, the alarm circuit further includes a buzzer, and a series branch formed by the light-emitting diode and the current-limiting resistor is connected with the buzzer in parallel.

An electronic cigarette battery reverse connection protection method, comprising the following steps:

S1, using a switch circuit to detect a power signal provided by a battery;

S2, using the switch circuit to determine whether the battery is reversely connected, if YES, turning to the step S3; if NO, turning to the step S4;

S3, turning a discharge control circuit off, turning an alarm circuit on, and using the alarm circuit to generate an alarm signal;

S4, when the battery is successfully set, using the discharge control circuit to control the load circuit to work.

Advantageously, the step S3 includes:

S31, turning off a first switch circuit, and using the first switch circuit to control the discharge control circuit to be turned off;

S32, turning a second switch circuit on, using the second switch circuit to control the alarm circuit to generate the alarm signal, wherein the alarm signal includes flashing light and/or sirens sound alarm.

When implementing the electronic cigarette battery reverse connection protection device and method for using the same of the present invention, the following advantageous effects can be achieved: by adding the switch circuit and the alarm circuit, the MOS transistor of the switch circuit can be used to effectively prevent the risk caused by the reverse connection of the anode and the cathode of the battery of battery-replaceable electronic cigarette products and accessories is reversely connected. Meanwhile, the alarm circuit is further used to remind users timely, and the MOS transistor has low power consumption and high efficiency.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the technical feature, objective and effect of the present invention be understood more clearly, now the specific implementation of the present invention is described in detail with reference to the accompanying drawings and embodiments.

Figure 1:
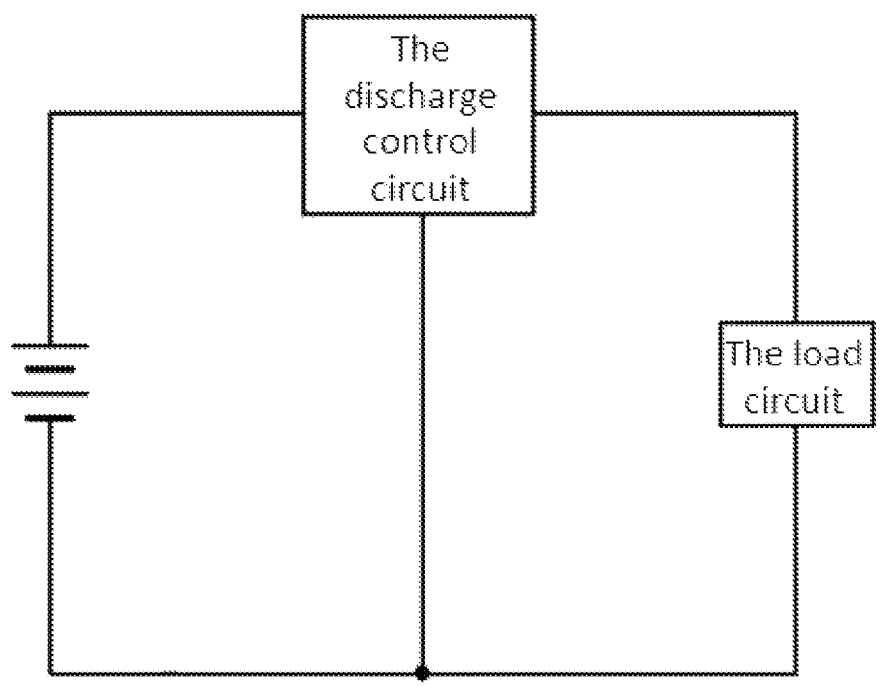
FIG. 1 is a schematic view of an electronic cigarette of the typical technology.
Figure 2:
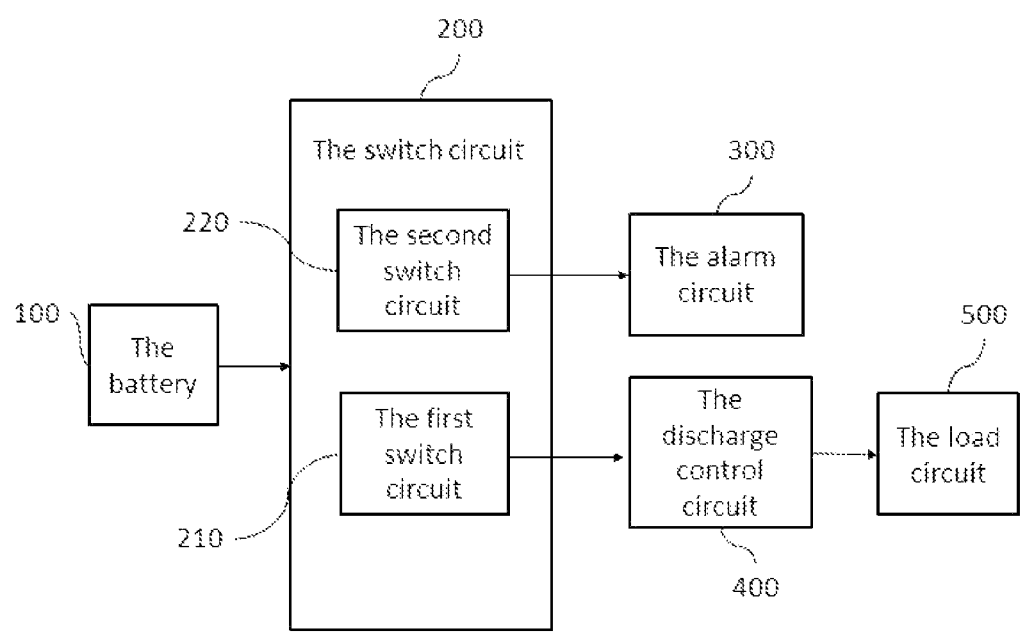
FIG. 2 is a block diagram of an electronic cigarette battery reverse connection protection device of the first embodiment of the present invention.

As is shown in FIG. 2, which is a block diagram of an electronic cigarette battery reverse connection protection device of a first embodiment of the present invention.

The first embodiment of the present invention comprises a battery 100, a switch circuit 200, an alarm circuit 300, a discharge control circuit 400, and a load circuit 500.

The battery 100 is connected with the switch circuit 200, and the switch circuit 200 is connected with the discharge control circuit 400 and the alarm circuit 300 respectively. The switch circuit 200 is configured to determine whether the battery 100 is reversely connected according to a power signal provided by the battery 100, and then controls the turn-on or turn-off of the alarm circuit 300 and the discharge circuit 400.

Particularly, the switch 200 includes a first switch circuit 210 and a second switch circuit 220.

The first switch circuit 210 is connected with the discharge control circuit 400, and is configured to turn the discharge control circuit 400 on or off by determining whether the battery 100 is reversely connected, thereby preventing damages of the discharge control circuit 400 when the battery 100 is reversely connected. The second switch circuit 220 is connected with the alarm circuit 300, and is configured to turn the alarm circuit 300 on and off by determining whether the battery 100 is reversely connected, thereby reminding that the battery 100 is reversely connected.

The alarm circuit 300 includes a light-emitting diode D and a current-limiting resistor R. The cathode of the light-emitting diodes D is connected with the anode of the battery 100 via the second switch circuit 220; the anode of the light-emitting diodes D is connected with one end of the current-limiting resistor R; and the other end of the current-limiting resistor R is connected with the cathode of the battery 100 via the second switch circuit 220. The alarm circuit 300 can also include a buzzer H, and a series branch comprised by the light-emitting diode D and the current-limiting resistor R is connected with the buzzer H in parallel.

The alarm circuit 300 can also include a single chip microcomputer (here in after referred to as "SCM", wherein a type of the SCM is not limited), a light emitting diode, and a buzzer (a light-emitting diode and/or a buzzer may be provided, and the optimization is to use both a light-emitting diode and a buzzer). The SCM is used to control whether the light-emitting diode and the buzzer starts to alarm and the alarm duration according to the turn-on or turn-off states of the second switch circuit 220. For example, in the case of the second switch circuit 220 turning off, the SCM does not work, and cannot send out alarm signal. In the case of the second switch circuit 220 turning on, the SCM starts to work, and sends out flashing lights and sirens sound alarm signals. At the same time, the SCM controls the alarm duration. In this embodiment, the alarm duration ranges from 5 seconds to 30 seconds, and the optimization thereof is 10 seconds. In the duration time, if the power signal detected by the second switch circuit 220 is still reversely connected, the SCM will stop sending out alarm signal in order to avoid consuming energy. Since the SCM alarm circuit design is prior art well known to the public in the field of electronic technology, so it will not be repeated here.

The discharge control circuit 400 is connected with the load circuit 500. The discharge control circuit 400 is configured to control the load circuit 500 working.

Figure 3:
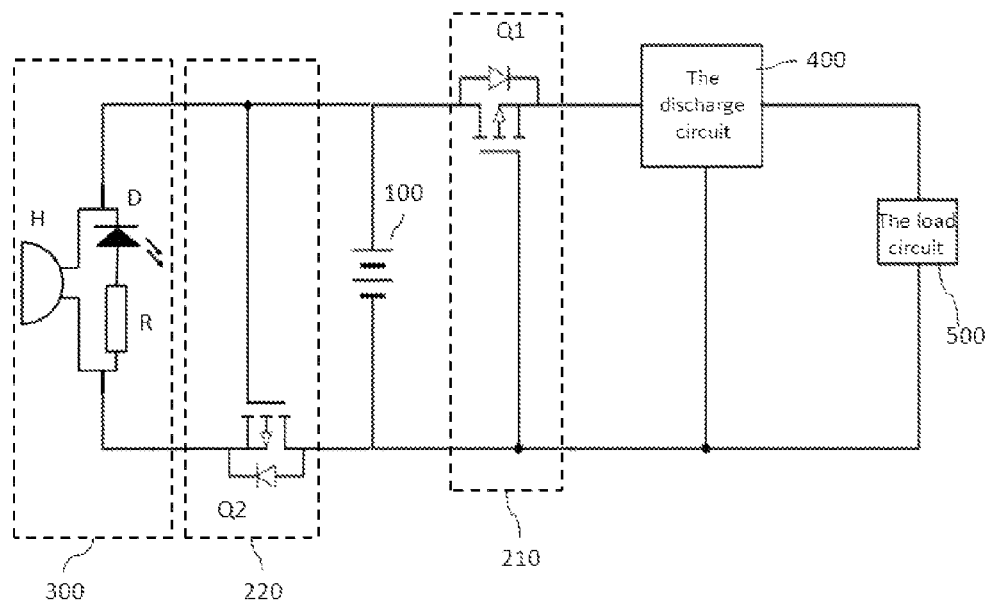
FIG. 3 is a circuit diagram of an electronic cigarette battery reverse connection protection device of the first embodiment of the present invention.

As is shown in FIG. 3, which is a circuit diagram of an electronic cigarette battery reverse connection protection device of the first embodiment of the present invention.

The first embodiment of the present invention comprises a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 has the function of flashing light and sirens sound alarm.

The first switch circuit 210 includes a first MOS transistor Q1. The first MOS transistor Q1 is a P type MOS transistor, the gate of the first MOS transistor Q1 is connected with the cathode of the battery 100, the drain of the first MOS transistor Q1 is connected with the anode of the battery 100, and the source of the first MOS transistor Q1 is connected with the discharge control circuit 400.

The second switch circuit 220 includes a second MOS transistor Q2. The second MOS transistor Q2 is a P type MOS transistor, the gate of the second MOS transistor Q1 is connected with the anode of the battery 100, the drain of the second MOS transistor Q2 is connected with the cathode of the battery 100, and the source of the second MOS transistor Q2 is connected with the alarm circuit 300.

The alarm circuit 300 includes a light-emitting diode D; a current-limiting resistor R and a buzzer H; the cathode of the light-emitting diode D is connected with the gate of the second MOS transistor Q2, the anode of the light-emitting diode is connected with one end of the current-limiting resistor, and the other end of the current-limiting resistor is connected with the source of the second MOS transistor Q2. A series branch formed by the light-emitting diode D and the current-limiting resistor R is connected with the buzzer H in parallel.

When the second switch circuit 220 adopts P type MOS transistors, if the SCM alarm circuit is selected, the SCM Vcc pins are connected with the source of the second MOS transistor Q2, the SCM Vss pins are connected with the anode of the battery 100, the light-emitting diode D and the buzzer H are connected in series and then are connected with the pins P1.0 and P1.1. The SCM is used to control whether the light-emitting diodes D and the buzzer alarm H starts to alarm and the alarm duration according to the turn-on or turn-off states of the second switch circuit 220.

If the battery 100 is correctly connected, on one hand, the positive signal of the battery is connected with the drain of the first MOS transistor Q1 and the source of the first MOS Q1 via the parasitic diode, and the negative signal of the battery 100 is directly connected with the gate of the first MOS transistor Q1. Therefore, an electric potential difference Vgs1 is generated between the gate and the source of the first MOS transistor Q1. At the moment, the electric potential difference Vgs1 of the first MOS transistor Q1 is negative, and is lower than the turn-on voltage of the first MOS transistor Q1 (turn-on voltages of P type MOS transistors are negative), which causes breakover between the drain and the source (the MOS transistor in the breakover state is equivalent to a resistor with a very small resistance, and the power consumption of the MOS transistor is very small, therefore the MOS transistor has high efficiency and generates little heat), and then controls the discharge control circuit 400 to be turned on. The discharge control circuit 400 controls the load circuit 500 normally working. On the other hand, the positive signal of the battery 100 is directly connected with the gate of the second MOS transistor Q2, therefore, another electric potential difference Vgs2 is generated between the gate and the source of the second transistor Q2. At the moment, the electric potential difference Vgs2 of the second MOS transistor Q2 is positive, and is higher than the turn-on voltage of the second MOS transistor Q2, which causes the drain and the source to be cut off, and then controls the alarm circuit 300 turning off and not sending out the alarm signal.

If the battery 100 is reversely connected, on one hand, the positive signal of the battery 100 is connected with the gate of the first MOS transistor Q1, therefore the electric potential difference Vgs1 is generated between the gate and the source of the first MOS transistor Q1; at the moment, the electric potential difference Vgs1 of the first MOS transistor Q1 is positive, and is higher than the turn-on voltage of the first MOS transistor Q1, which causes the drain and the source of the first MOS transistor Q1 to be cut off, and then controls the alarm circuit 300 turning off. The load circuit 500 does not work. On the other hand, the positive signal of the battery 100 is directly connected to the gate of the second MOS transistor Q2, therefore the electric potential difference Vgs2 is generated between the gate and the source of the second MOS transistor Q2; at the moment, the electric potential difference Vgs2 of the second MOS transistor Q2 is positive, and is higher than the turn-on voltage of the second MOS transistor Q2, which causes the drain and the source of the second MOS transistor Q2 to be cut off, and then controls the alarm circuit 300 turning off and not sending out the alarm signal.

Figure 4:
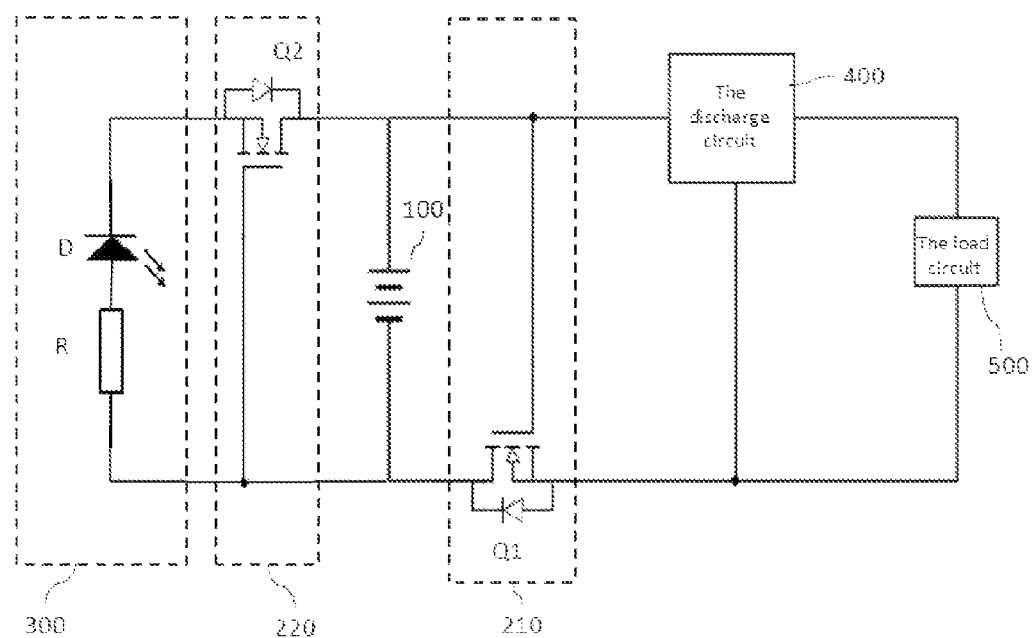
FIG. 4 is a circuit diagram of an electronic cigarette battery reverse connection protection device of the second embodiment of the present invention.

As is shown in FIG. 4, which is a circuit diagram of an electronic cigarette battery reverse connection protection device of the second embodiment of the present invention;

The second embodiment of the present invention comprises: a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 has the function of flashing light alarm.

The first switch circuit 210 includes a first MOS transistor Q1. The first MOS transistor Q1 is an N type MOS transistor, the gate of the first MOS transistor Q1 is connected with the anode of the battery 100, the drain of the first MOS transistor Q1 is connected with the cathode of the battery 100, the source of the first MOS transistor Q1 is connected with the discharge control circuit 400.

The second switch circuit 220 includes a second MOS transistor Q2. The second MOS transistor Q2 is an N type MOS transistor, the gate of the second MOS transistor Q1 is connected with the cathode of the battery 100, the drain of the second MOS transistor Q2 is connected with the anode of the battery 100, the source of the second MOS transistor Q2 is connected with the alarm circuit 300.

The alarm circuit 300 includes a light-emitting diode D. A current-limiting resistor R and a buzzer H, the cathode of the light-emitting diode D is connected with the source of the second MOS transistor Q2, the anode of the light-emitting diode is connected with one end of the current-limiting resistor, the other end of the current-limiting resistor is connected with the gate of the second MOS transistor Q2.

When the second switch circuit 220 adopts N type MOS transistors, if the SCM alarm circuit is selected, the SCM Vcc pins are connected with the anode of the second MOS transistor Q2, the SCM Vss pins are connected with the source of the battery 100, the two ends of the light-emitting diode D are connected with the pins P1.0 and P1.1. The SCM is used to control whether the light-emitting diodes D starts to alarm and the alarm duration according to the turn-on or turn-off states of the second switch circuit 220.

If the battery 100 is correctly connected, on one hand, the positive signal of the battery 100 is connected with the gate of the first MOS transistor Q1, therefore, an electric potential difference Vgs1 between the gate and the source of the first MOS transistor Q1. At the moment, the Vgs1 of the first MOS transistor Q1 is positive, and is higher than the turn-on voltage of the first MOS transistor Q1, which causes breakover between the drain and the source of the first MOS transistor Q1, then the discharge control circuit 400 controls the load circuit 500 normally working. On the other hand, the negative signal of the battery 100 is directly connected with the gate of the second MOS transistor Q2, therefore, an electric potential difference Vgs2 is generated between the gate and the source of the second MOS transistor Q2. At the moment, the electric potential difference Vgs2 of the second MOS transistor Q2 is lower than the turn-on voltage of the second MOS transistor Q2, which caused the drain and source to be cut off, and then controls the alarm circuit 300 turning off and not sending out the alarm signal.

If the battery 100 is reversely connected, on one hand, the negative signal of the battery 100 is connected with the gate of the first MOS transistor Q1, therefore, an electric potential difference Vgs1 is generated between the gate and the source of the first MOS transistor Q1. At the moment, the electric potential difference Vgs1 of the first MOS transistor Q1 is lower than the turn-on voltage of the first MOS transistor Q1, which causes the drain and source of the first MOS transistor Q1 to be cut off, and then control the alarm circuit 400 turning off. The load circuit 500 does not work. On the other hand, the positive signal of the battery 100 is directly connected with the gate of the second MOS transistor Q2, therefore, an electric potential difference Vgs2 is generated between the gate and the source of the second MOS transistor Q2. At the moment, the electric potential difference Vgs2 of the second MOS transistor Q2 is positive, and is higher than the turn-on voltage of the second MOS transistor Q2, which causes breakover between the drain and the source of the second MOS transistor Q2, and then controls the alarm circuit 300 turning on and sending out the alarm signal to achieve flashing light alarm.

Figure 5:
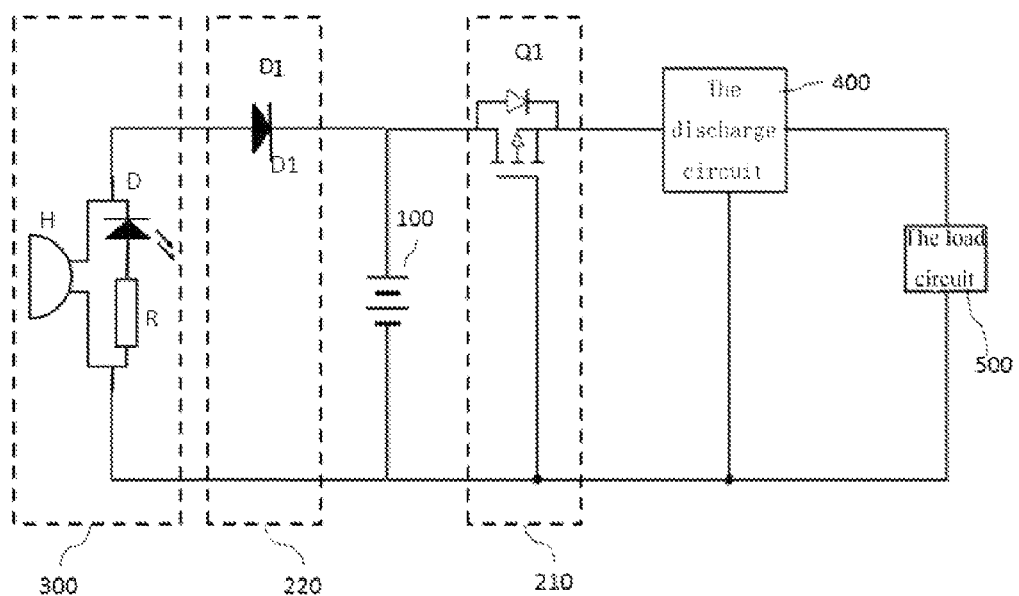
FIG. 5 is a circuit diagram of an electronic cigarette battery reverse connection protection device of the third embodiment of the present invention.

As is shown in FIG. 5, which is a circuit diagram of an electronic cigarette battery reverse connection protection device of the third embodiment of the present invention.

The third embodiment of the present invention comprises a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 has the function of a flashing light and sirens sound alarm.

The first switch circuit 210 includes a first MOS transistor Q1. The first MOS transistor Q1 is a P type MOS transistor, the gate of the first MOS transistor Q1 is connected with the cathode of the battery 100, the drain of the first MOS transistor Q1 is connected with the anode of the battery 100, the source of the first MOS transistor Q1 is connected with the discharge control circuit 400.

The second switch circuit 220 includes a light-emitting diode D1. The cathode of the light-emitting diode D1 is connected with the anode of the battery 100, the anode of the light-emitting diode D1 is connected with the alarm circuit 300.

The alarm circuit 300 includes a light-emitting diode D, a current-limiting resistor R and a buzzer H. The cathode of the light-emitting diode D is connected with the anode of the light-emitting diode D1, the anode of the light-emitting diode is connected with one end of the current-limiting resistor, the other end of the current-limiting resistor is connected with the cathode of the battery 100. A series branch formed by the light-emitting diode D and the current-limiting resistor R is connected with the buzzer H in parallel.

When the second switch circuit 220 adopts the light-emitting diode D1, if the SCM alarm circuit is selected, the SCM Vcc pins are connected with the cathode of the battery 100, the SCM Vss pins are connected with the anode of the light-emitting diode D1, the light-emitting diode D and the buzzer H are connected in series and then are connected with the pins P1.0 and P1.1. The SCM is used to control whether the light-emitting diodes D and the buzzer alarm H starts to alarm and the alarm duration according to the turn-on or turn-off of the second switch circuit 220.

If the battery 100 is correctly connected, on one hand, the positive signal of the battery 100 is connected to the drain and the source of the first MOS Q1 via the parasitic diode, and the negative signal of the battery 100 is directly connected with the gate of the first MOS Q1, therefore, an electric potential difference Vgs1 is generated between the gate and the source of the first MOS transistor Q1. At the moment, the electric potential difference Vgs1 of the first MOS transistor Q1 is negative, and is lower than the turn-on voltage of the first MOS transistor Q1, which causes breakover between the drain and source of the first MOS transistor Q1, and then controls the discharge control circuit 400 turning on, the discharge control circuit 400 controls the load circuit 500 normally working. On the other hand, the cathode of the diode D1 is connected with the anode of the battery 100, the diode D1 is in off state according to unilateral conductivity, and then controls the alarm circuit 300 turning off and not sending out the alarm signal.

If the battery 100 is reversely connected, on one hand, the positive signal of the battery 100 is connected with the gate of the first MOS transistor Q1, therefore, an electric potential difference Vgs1 is generated between the gate and the source of the first MOS transistor Q1, at the moment, the electric potential difference Vgs1 of the first MOS transistor Q1 is positive, and is higher than the turn-on voltage of the first MOS transistor Q1, which causes the drain and the source of the first MOS transistor Q1 to be cut off, and then controls the alarm circuit 300 turning off, the load circuit 500 does not work. On the other hand, the cathode of the diode D1 is connected with the anode of the battery 100, the diode D1 is in off state according to unilateral conductivity, and then controls the alarm circuit 300 turning on and sending out the alarm signal to achieve flashing light and siren sound alarm.

A fourth embodiment of the present invention comprises: a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 includes a SCM, a light-emitting diode, achieves flashing light alarm.

The first switch circuit 210 includes a first MOS transistor Q1, the first MOS transistor Q1 is a P type MOS transistor. The gate of the first MOS transistor Q1 is connected with the cathode of the battery 100, the drain of the first MOS transistor Q1 is connected with the anode of the battery 100, the source of the first MOS transistor Q1 is connected with the discharge control circuit 400.

The second switch circuit 220 includes a second MOS transistor Q2, the second MOS transistor Q2 is an N type MOS transistor. The gate of the second MOS transistor Q1 is connected with the cathode of the battery 100, the drain of the second MOS transistor Q2 is connected with the anode of the battery 100, the source of the second MOS transistor Q2 is connected with the alarm circuit 300.

If the battery 100 is correctly connected, on one hand, the positive signal of the battery 100 is connected with the source and the source of the first MOS transistor Q1 via the parasitic diode. The negative signal of the battery 100 is directly connected with the gate of the first MOS transistor Q1, therefore, an electric potential difference Vgs1 is generated between the gate and the source of the first MOS transistor Q1. At the moment, the electric potential difference Vgs1 of the first MOS transistor Q1 is negative, and is lower than the turn-on voltage of the first MOS transistor Q1, which causes breakover between the drain and the source, then controls the discharge control circuit 400 turning on, the discharge control circuit 400 controls the load circuit 500 normally working. On the other hand, the positive signal of the battery 100 is directly connected with the gate of the second MOS transistor Q2, therefore, an electric potential difference Vgs2 is generated between the gate and the source of the second MOS transistor Q2, at the moment, the electric potential difference Vgs2 of the second MOS transistor Q2 is lower than the turn-on voltage of the second MOS transistor Q2, which causes the drain and source to be cutoff, and then controls the alarm circuit 300 turning off, namely, controls the SCM of the alarm circuit 300 not working and not sending out the alarm signal.

If the battery 100 is reversely connected, on one hand, the positive signal of the battery 100 is connected with the gate of the first MOS transistor Q1, therefore, an electric potential difference Vgs1 is generated between the gate and the source of the first MOS transistor Q1, at the moment, the electric potential difference Vgs1 of the first MOS transistor Q1 is positive, and is higher than the turn-on voltage of the first MOS transistor Q1, which causes the drain and the source to be cut off, and then controls the alarm circuit 300 turning off, the load circuit 500 does not work. On the other hand, the positive signal of the battery 100 is directly connected with the gate of the second MOS transistor Q2, therefore, an electric potential difference Vgs2 is generated between the gate and the source of the second MOS transistor Q2, at the moment, the electric potential difference Vgs2 of the second MOS transistor Q2 is positive, and is higher than the turn-on voltage of the second MOS transistor Q2, which causes breakover between the drain and the source, and then controls the alarm circuit 300 turning on, namely, controls the SCM of the alarm circuit 300 working and achieving flashing light alarm.

A fifth embodiment of the present invention includes a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 has function of flashing light alarm.

The first switch circuit 210 includes a first MOS transistor Q1, the first MOS transistor Q1 is an N type MOS transistor. The gate of the first MOS transistor Q1 is connected with the anode of the battery 100, the drain of the first MOS transistor Q1 is connected with the cathode of the battery 100, the source of the first MOS transistor Q1 is connected with the discharge control circuit 400.

The second switch circuit 220 includes a second MOS transistor Q2, the second MOS transistor Q2 is a P type MOS transistor. The gate of the second MOS transistor Q1 is connected with the anode of the battery 100, the drain of the second MOS transistor Q2 is connected with the cathode of the battery 100, the source of the second MOS transistor Q2 is connected with the alarm circuit 300.

The alarm circuit 300 includes a light-emitting diode D, a current-limiting resistor R. The cathode of the light-emitting diode D is connected with the gate of the second MOS transistor Q2, the anode of the light-emitting diode is connected with one end of the current-limiting resistor R, the other end of the current-limiting resistor is connected with the source of the second MOS transistor Q2.

If the battery 100 is correctly connected, on one hand, the positive signal of the battery 100 is connected with the gate of the first MOS transistor Q1, therefore, an electric potential difference Vgs1 is generated between the gate and the source of the first MOS transistor Q1, at the moment, the Vgs1 of the first MOS transistor Q1 is positive, and is higher than the turn-on voltage of the first MOS transistor Q1, which causes breakover between the drain and source of the first MOS transistor Q1, then the discharge control circuit 400 controls the load circuit 500 normally working. On the other hand, the negative signal of the battery 100 is connected with the gate of the second MOS transistor Q2, therefore, an electric potential difference Vgs2 is generated between the gate and the source of the second MOS transistor Q2, at the moment, the electric potential difference Vgs2 of the second MOS transistor Q2 is lower than the turn-on voltage of the second MOS transistor Q2, which causes the drain and the source to be cut off, and then controls the alarm circuit 300 turning off and not sending out the alarm signal.

If the battery 100 is reversely connected, on one hand, the negative signal of the battery 100 is connected to the gate of the first MOS transistor Q1, therefore, an electric potential difference Vgs1 is generated between the gate and the source of the first MOS transistor Q1, at the moment, the Vgs1 of the first MOS transistor Q1 is lower than the turn-on voltage of the first MOS transistor Q1, which causes the drain and the source to be cut off, and then control the alarm circuit 400 turning off, the load circuit 500 does not work. On the other hand, the positive signal of the battery 100 is directly connected to the gate of the second MOS transistor Q2, therefore, an electric potential difference Vgs2 is generated between the gate and the source of the second MOS transistor Q2, at the moment, the electric potential difference Vgs2 of the second MOS transistor Q2 is positive, and is higher than the turn-on voltage of the second MOS transistor Q2, which causes breakover between the drain and source of the second MOS transistor Q2, and then controls the alarm circuit 300 turning on and sending out the alarm signal to achieve flashing light alarm.

A sixth embodiment of the present invention comprises: a battery 100, a switch circuit 200, an alarm circuit 300, a discharge control circuit 400 and a load circuit 500, wherein, the switch circuit 200 includes a first switch circuit 210 and a second switch circuit 220. The alarm circuit 300 includes a SCM, a light-emitting diode, a buzzer which achieves flashing light and sirens sound alarm.

The first switch circuit 210 includes a first MOS transistor Q1, the first MOS transistor Q1 is an N type MOS transistor. The gate of the first MOS transistor Q1 is connected with the anode of the battery 100, the drain of the first MOS transistor Q1 is connected with the cathode of the battery 100, the source of the first MOS transistor Q1 is connected with the discharge control circuit 400.

The second switch circuit 220 includes a light-emitting diode D1. The cathode of the light-emitting diode D1 is connected with the anode of the battery 100, the anode of the light-emitting diode D1 is connected with the alarm circuit 300.

If the battery 100 is correctly connected, on one hand, the positive signal of the battery 100 is connected with the gate of the first MOS transistor Q1, therefore, an electric potential difference Vgs1 is generated between the gate and the source of the first MOS transistor Q1, at the moment, the electric potential difference Vgs1 of the first MOS transistor Q1 is positive, and is higher than the turn-on voltage of the first MOS transistor Q1, which causes breakover between the drain and the source, then controls the discharge control circuit 400 turning on, the discharge control circuit 400 controls the load circuit 500 normally working. On the other hand, the cathode of the diode D1 is connected with the anode of the battery 100, the diode D1 is in off state according to unilateral conductivity, and then controls the alarm circuit 300 turning off and not sending out the alarm signal.

If the battery 100 is reversely connected, on one hand, the negative signal of the battery 100 is connected with the gate of the first MOS transistor Q1, therefore, an electric potential difference Vgs1 is generated between the gate and the source of the first MOS transistor Q1, at the moment, the electric potential difference Vgs1 of the first MOS transistor Q1 is lower than the turn-on voltage of the first MOS transistor Q1, which causes the drain and the source to be cut off, and then controls the alarm circuit 400 turning off, the load circuit does not work. On the other hand, the cathode of the diode D1 is connected with the anode of the battery 100, the diode D1 is in off state according to unilateral conductivity, and then controls the alarm circuit 300 turning on and sending out the alarm signal to achieve flashing light alarm.

Figure 6:
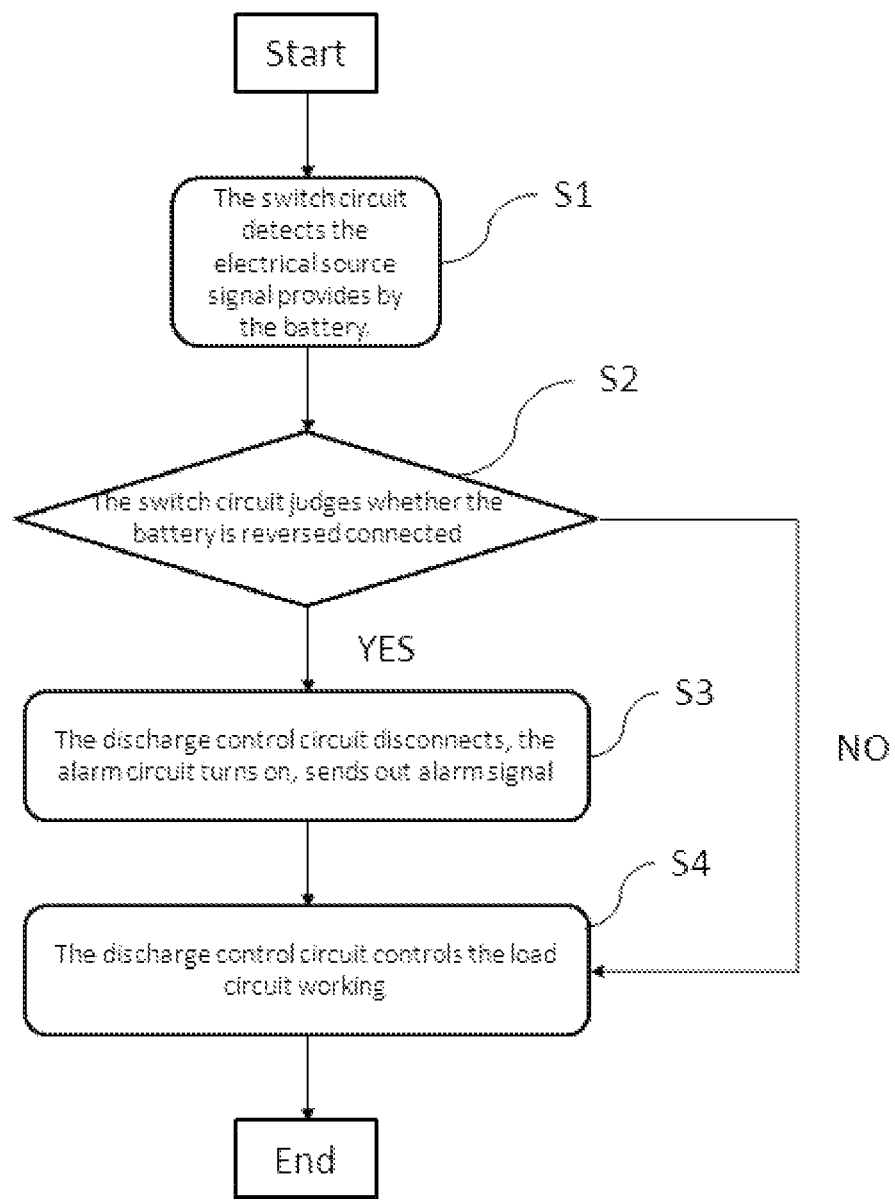
FIG. 6 is a flow chart of an electronic cigarette battery reverse connection protection method of the present invention.

As is shown in FIG. 6, which is a flow chart of an electronic cigarette battery reverse connection protection method of an embodiment of the present invention.

An electronic cigarette battery reverse connection protection method of the embodiment of the present invention comprises the following steps:

S1, using a switch circuit to detect a power signal provided by a battery;

S2, using the switch circuit to determine whether the battery is reversely connected, if YES, turning to the step S3; if NO, turning to the step S4;

S3, turning a discharge control circuit off, turning an alarm circuit on, and using the alarm circuit to generate an alarm signal;

S4, when the battery is successfully set, using the discharge control circuit to control the load circuit to work.

The step S3 particularly includes the following steps:

S31, turning off a first switch circuit, and using the first switch circuit to control the discharge control circuit to be turned off;

S32, turning a second switch circuit on, using the second switch circuit to control the alarm circuit to generate the alarm signal, wherein the alarm signal includes flashing light and/or sirens sound alarm.

By adding the switch circuit 200 and the alarm circuit 300, and using the MOS transistors of the switch circuit 200, the present invention effectively prevents the risk caused by reverse connections of anodes and cathodes of batteries of battery-replaceable electronic cigarettes and accessories. Meanwhile, the alarm circuit is further used to remind users timely, and the MOS transistors have low power consumption and high efficiency.

While the embodiments of the present invention are described with reference to the accompanying drawings above, the present invention is not limited to the above-mentioned specific implementations. In fact, the above-mentioned specific implementations are intended to be exemplary not to be limiting. In the inspiration of the present invention, those ordinary skills in the art can also make many modifications without breaking away from the subject of the present invention and the protection scope of the claims. All these modifications belong to the protection of the present invention.

What is claimed is:

1. An electronic cigarette battery reverse connection protection device, comprising: a battery, a switch circuit, an alarm circuit, a discharge control circuit and a load circuit;

wherein the battery is connected with the switch circuit; the switch circuit is connected with the discharge control circuit and the alarm circuit respectively; and the discharge control circuit is connected with the load circuit;

wherein the switch circuit is configured to determine whether the battery is reversely connected according to a power signal provided by the battery; when the battery is reversely connected, the discharge control circuit is turned off, and the alarm circuit is turned on and generates an alarm signal; and when the battery is correctly connected, the discharge control circuit controls the load circuit working;

wherein the switch circuit includes a first switch circuit and a second switch circuit;

the first switch circuit is connected with the discharge control circuit the first switch circuit is configured to turn the discharge control circuit off when the battery is determined as being reversely connected; and the second switch circuit is connected with the alarm circuit the second switch circuit is configured to turn the alarm circuit on when the battery is determined as being reversely connected; and thereby reminding that the battery is reversely connected.

2. The electronic cigarette battery reverse connection protection device according to claim 1, wherein, the first switch circuit includes a first MOS transistor, the first MOS transistor is a P type MOS transistor, a gate of the first MOS transistor is connected with a cathode of the battery; a drain of the first MOS transistor is connected with an anode of the battery; and a source of the first MOS transistor is connected with the discharge control circuit.

3. The electronic cigarette battery reverse connection protection device according to claim 1, wherein, the first switch circuit includes a first MOS transistor, the first MOS transistor is an N type MOS transistor, a gate of the first MOS transistor is connected with an anode of the battery, a drain of the first MOS transistor is connected with a cathode of the battery; a source of the first MOS transistor is connected with the discharge control circuit.

4. The electronic cigarette battery reverse connection protection device according to claim 1, wherein, the second switch circuit includes a second MOS transistor, the second MOS transistor is a P type MOS transistor, a gate of the second MOS transistor is connected with an anode of the battery; a drain of the second MOS transistor is connected with a cathode of the battery; a source of the second MOS transistor is connected with the discharge control circuit.

5. The electronic cigarette battery reverse connection protection device according to claim 4, wherein, the second switch circuit includes a diode, a cathode of the diode is connected with the anode of the battery; an anode of the diode is connected with the alarm circuit; and the diode is configured to control the alarm circuit to be turned on and off by unilateral conductivity thereof.

6. The electronic cigarette battery reverse connection protection device according to claim 5, wherein, the alarm circuit includes a light-emitting diode and a current-limiting resistor, a cathode of the light-emitting diode is connected with the source of the second MOS transistor; an anode of the light-emitting diode is connected with one end of the current-limiting resistor; the other end of the current-limiting resistor is connected with the gate of the second MOS transistor.

7. The electronic cigarette battery reverse connection protection device according to claim 5, wherein, the alarm circuit includes a light-emitting diode and a current-limiting resistor, a cathode of the light-emitting diode is connected with the anode of the diode; an anode of the light-emitting diode is connected with one end of the current-limiting resistor; the other end of the current-limiting resistor is connected with the cathode of the battery.

8. The electronic cigarette battery reverse connection protection device according to claim 1, wherein, the second switch circuit includes a second MOS transistor, the second MOS transistor is an N type MOS transistor, a gate of the second MOS transistor is connected with a cathode of the battery; a drain of the second MOS transistor is connected with an anode of the battery; a source of the second MOS transistor is connected with the discharge control circuit.

9. The electronic cigarette battery reverse connection protection device according to claim 8, wherein, the alarm circuit includes a light-emitting diode and a current-limiting resistor, a cathode of the light-emitting diode is connected with the gate of the second MOS transistor; an anode of the light-emitting diode is connected with one end of the current-limiting resistor; and the other end of the current-limiting resistor is connected with the source of the second MOS transistor.

10. The electronic cigarette battery reverse connection protection device according to claim 9, wherein, the alarm circuit further includes a buzzer, and a series branch formed by the light-emitting diode and the current-limiting resistor is connected with the buzzer in parallel.

11. An electronic cigarette battery reverse connection protection method, comprising the following steps:

S1, using a switch circuit to detect a power signal provided by a battery;

S2, using the switch circuit to determine whether the battery is reversely connected, if YES, turning to the step S3; if NO, turning to the step S4;

S3, turning off a first switch circuit, and using the first switch circuit to control a discharge control circuit to be turned off;

S4, turning a second switch circuit on, using the second switch circuit to control an alarm circuit to generate an alarm signal, wherein the alarm signal includes flashing light and/or sirens sound alarm;

S5, when the battery is successfully set, using the discharge control circuit to control a load circuit to work.

* * * * *